United States Patent [19]
Ueda

[11] 4,289,971
[45] Sep. 15, 1981

[54] ELECTRIC POWER GENERATION EQUIPMENT INCORPORATING BULB TURBINE-GENERATOR

[75] Inventor: Tsuneo Ueda, Kawasaki, Japan

[73] Assignee: Fuji Electric Co., Ltd., Kawasaki, Japan

[21] Appl. No.: 33,083

[22] Filed: Apr. 25, 1979

[30] Foreign Application Priority Data

Apr. 18, 1979 [JP] Japan .................. 54/47700

[51] Int. Cl.³ .................. F01D 15/10; F02C 6/00; H02K 7/18; F16D 31/02
[52] U.S. Cl. .................. 290/52; 405/75; 405/78; 405/104; 60/398
[58] Field of Search ............ 405/78, 75, 127, 104; 290/52, 1 A; 60/398

[56] References Cited

U.S. PATENT DOCUMENTS

| | | | |
|---|---|---|---|
| 2,783,392 | 2/1957 | Corbiere | 290/52 |
| 4,073,146 | 2/1978 | Atencio | 405/78 |
| 4,102,599 | 7/1978 | Ziegler | 415/219 R |
| 4,120,602 | 10/1978 | Megnint | 415/1 |
| 4,159,188 | 6/1979 | Atencio | 405/78 |
| 4,165,467 | 8/1979 | Atencio | 290/52 |

*Primary Examiner*—J. V. Truhe
*Assistant Examiner*—John B Conklin
*Attorney, Agent, or Firm*—Sughrue, Mion, Zinn, Macpeak and Seas

[57] ABSTRACT

A hydroelectric power generator having a bulb turbine generator housed in a bulb shaped inner casing. The turbine runner of the generator is connected to a main shaft of the electric power generator. The outer casing is coupled to the inner casing by stay vanes. A draft tube is coupled to the downstream end of the outer casing. A liftable gate is positioned to retain water in the open channel and the outer casing is fixedly secured to the gate and vertically movable with it.

9 Claims, 10 Drawing Figures

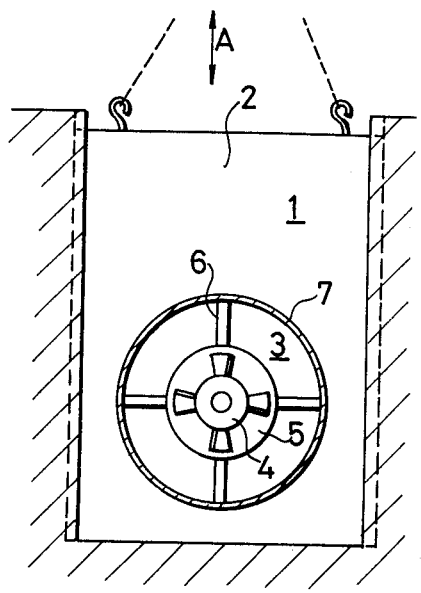
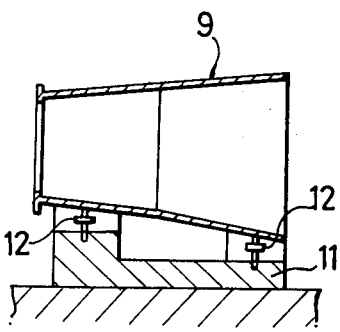
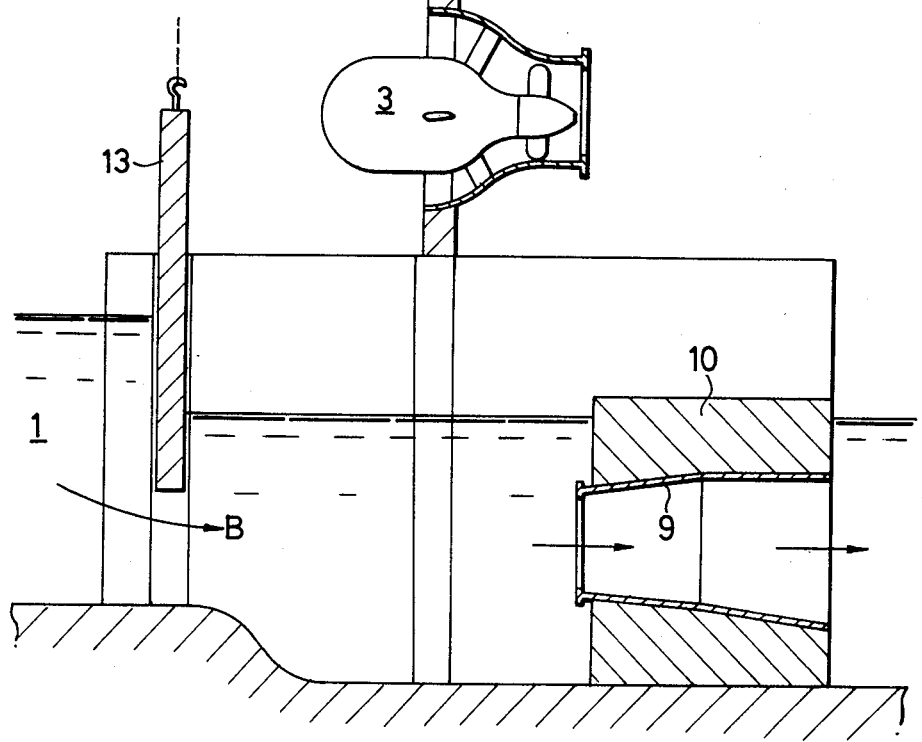

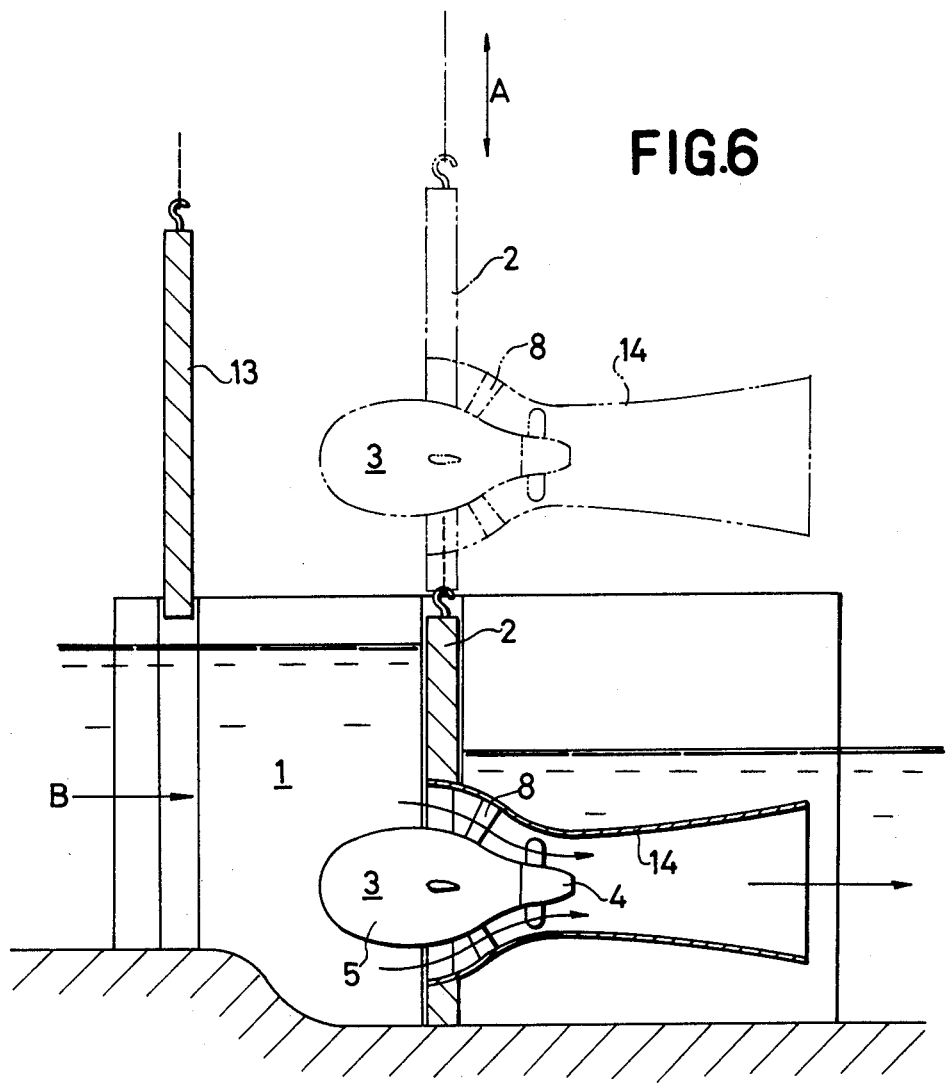
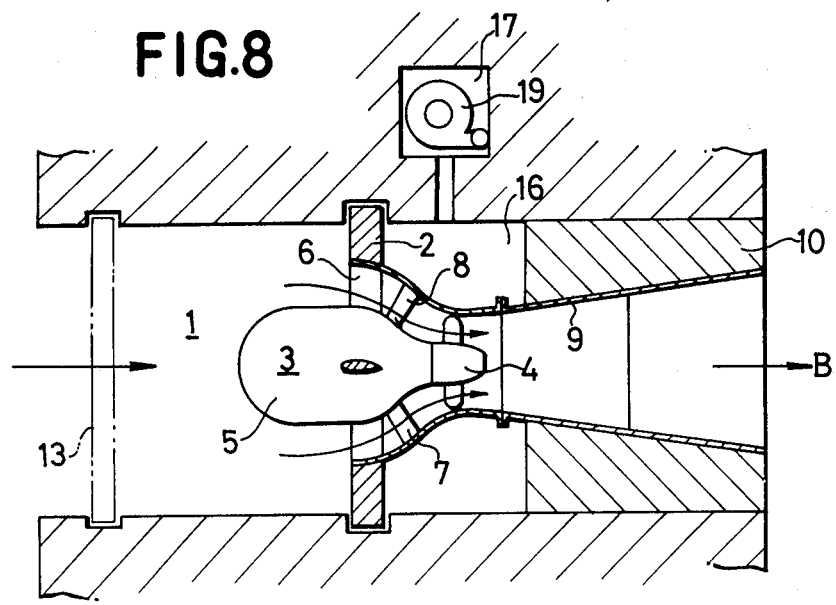

ELECTRIC POWER GENERATION EQUIPMENT INCORPORATING BULB TURBINE-GENERATOR

BACKGROUND OF THE INVENTION

This invention relates to a bulb-turbine-generator, and more particularly, to apparatus of small capacity for electric power generation adapted to be easily installed in dam-spillways or irrigation channels having an extremely small head.

The development of hydraulic energy has received increasing attention in recent years in terms of energy resource economization. It is utilized in locations of a small head such as in rivers, spillways of existing dams, open channels for irrigation, survice water, or the like, as a developing area to make use of hydraulic power.

Conventionally, bulb-turbine-generators have been widely used and installed at spots of a small head to obtain hydroelectric power. As is well known, the bulb turbine-generator is fixedly secured within a casing made of concrete materials and the casing is constructed in the open channel. Therefore, civil construction expenses can be extremely costly in terms of installation of a relatively small hydroelectric power generation unit.

Further, in case of overhaul or repair of the turbine-generator, water should be blocked by gates disposed at upstream and downstream sides of the turbine. Such work is carried out in the channel after discharging water around the turbine, which is extremely troublesome and requires a long period of time. Additionally, there are disadvantages for downstream areas of the hydroelectric power generation in case of blocking of water, i.e., necessary water for irrigation or service water can not be obtained at the downstream area if the water is blocked for overhauling of the turbine-generator, and if the overhauling takes extensive time, severe problems may arise at the downstream area.

SUMMARY OF THE INVENTION

It is therefore, an object of this invention to overcome the above-mentioned drawbacks and to provide an improved hydroelectric power generation unit having a bulb turbine generator.

Another object of this invention is to provide a device which enables a continuous water supply to the downstream area for irrigation or the like even during overhauling of the bulb turbine-generator.

Still another object of this invention is to provide a device whose overhaul can be easily carried out and which is capable of operation even during flooding.

These objects are attained in accordance with this invention by providing a liftable gate disposed to partition or block the open channel or spillway. The liftable gate is provided with an outer casing in which a bulb shape turbine generator having a turbine runner connected to a main shaft of the generator is centrally supported by stay vanes. Further a draft tube is coupled at the downstream end of the outer casing. Alternatively, the draft tube is integral with the outer casing.

These and other objects of this invention will become apparent from the description of the drawings and the preferred embodiments which follow.

BRIEF DESCRIPTION OF THE DRAWINGS

In the drawings;

FIG. 3 is a cross-sectional illustration taken along the line III—III as viewed from an arrow shown in FIG. 1;

FIG. 4 is a cross-sectional illustration of a draft tube according to the another embodiment of this invention;

FIG. 5 is a cross-sectional illustration which shows the state of lifting the gate together with the turbine-generator according to this invention;

FIG. 6 is a longitudinal cross-sectional illustration of the hydroelectric power generation equipment according to a second embodiment of this invention;

FIG. 8 is a transversal cross-sectional illustration of FIG. 7;

DETAILED DESCRIPTION OF THE INVENTION

Figure 1:
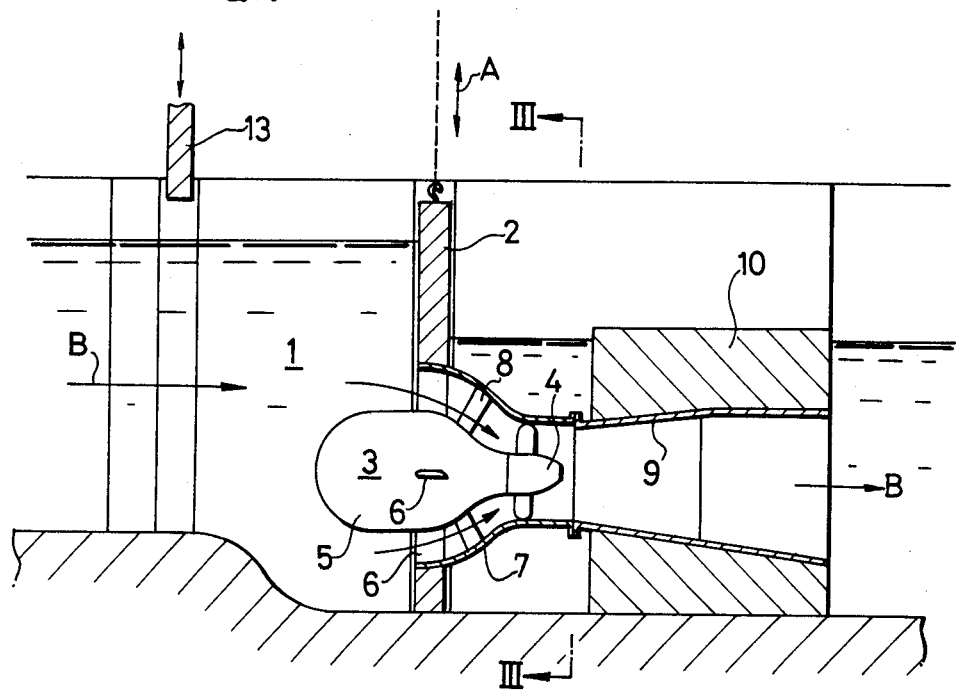
FIG. 1 is a longitudinal cross-sectional illustration showing the hydroelectric power generation equipment according to this invention.
Figure 2:
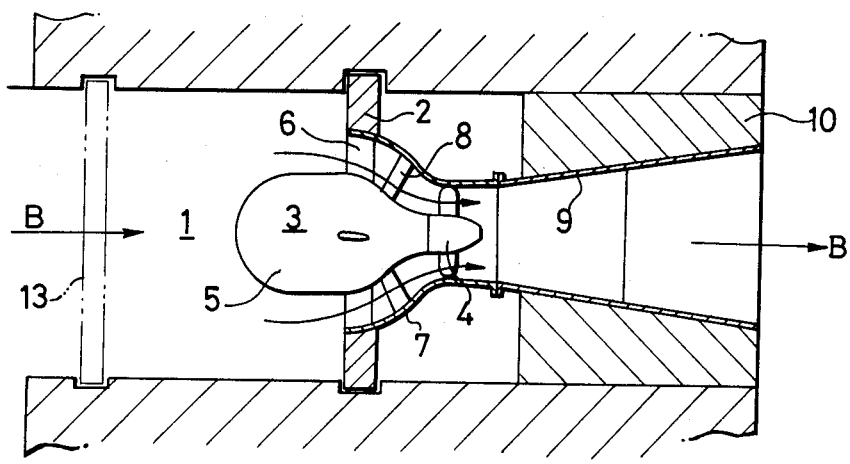
FIG. 2 is a transversal cross-sectional illustration showing the hydroelectric power generation equipment according to this invention.
Figure 7:
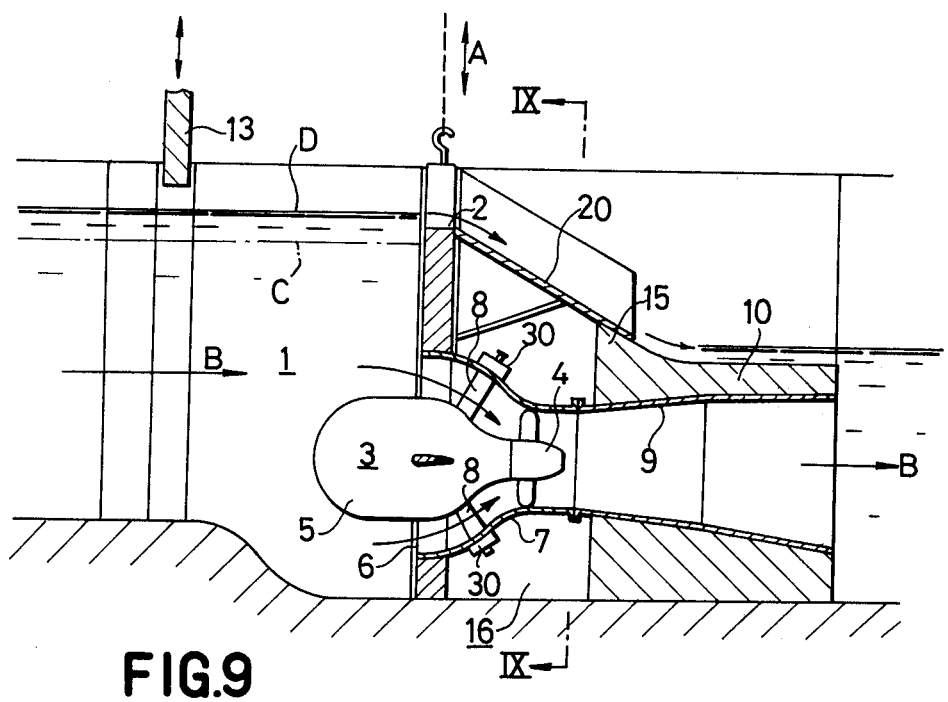
FIG. 7 is a longitudinal cross sectional illustration showing an overflow panel incorporated in the hydroelectric power generation equipment according to this invention.

Referring now to the drawings, and initially to FIGS. 1 through 3, reference numeral 1 designates an open channel of dam spillway, irrigation channel or service water, in which a gate 2 is liftably disposed to dam up the open channel 1. The gate 2 can be lifted along the direction shown by an arrow A by a lifting device (not shown). A turbine-generator 3 is fixedly secured to the gate 2. The turbine-generator 3 comprises an outer casing 7, and a bulb 5 which houses an electric power generator whose main shaft is connected to a turbine runner 4. The bulb 5 is centrally secured to the outer casing 7 by stay vanes 8. The outer casing 7 is fixedly secured to the gate 2. Further, a plurality of guide vanes 8 are provided to provide suitable flow direction for the rotation of the turbine runner 4. The guide vanes are stationarily disposed between the outer casing and the bulb, or the guide vanes are pivotablly secured about their axis to control the flowing direction of water.

Reference numeral 9 designates a draft tube adapted to be coupled with the downstream end of the outer casing 7. In this embodiment, the draft tube 9 is embedded in a concrete base 10 disposed at the downstream side of the turbine, and the outer casing 7 is detachable from the draft tube 9. The draft tube 9 can be mounted on a base 11 and is connected thereto by bolts 12 as shown in FIG. 4. According to the embodiment shown in FIG. 4, it is recognized that the construction work for installing the draft tube 9 can be easily carried out. At the upstream side of the gate 2, a second liftable gate 13 is disposed to dam up the open channel 1 to control fluid amount to be flown into the turbine generator 3.

During operating conditions, the gate 2 is positioned as shown in FIG. 1 and the gate 13 is opened allowing water flow along the direction shown by an arrow B. A fluid passage defined between the outer casing 7 and the bulb 5 is opened by opening the guide vanes 8 to thereby apply hydraulic power to the turbine runner 4 to rotate the same. In this case, the outer casing and the draft tube are coupled with each other by a loose flange 9' to permit sealing contact avoiding fluid leakage and air to enter as well as permitting easy detachment of the outer casing from the tube 9.

In case of overhauling or inspection of the turbine-generator 3, the gate 2 is lifted up as shown in FIG. 5. Therefore, the turbine-generator 3 is taken out from the open channel 1, and overhauling thereof can be achieved at the lifted position. In this case, since water can flow to the downstream side through the draft tube 9, continuous water flow can be maintained even during overhauling of the turbine-generator 3.

A second embodiment of this invention is shown in FIG. 6, wherein like parts and components are designated by the same reference numerals as those shown in the first embodiment. According to this second embodiment, the outer casing and the draft tube is in integral structure as at 14. Therefore, if the gate 2 is at the descent position, the turbine-generator 3 is positioned in water and the water is dammed up by the gate 2, so that the turbine-generator 3 is operated by opening the guide vanes 8.

In case of the inspection or overhaul of the turbine-generator 3, the gate 2 is lifted up as shown by a chain line in FIG. 6. The water supply to the downstream area is maintained. Of course, the supplying amount can be controlled by the gate 13.

Figure 9:
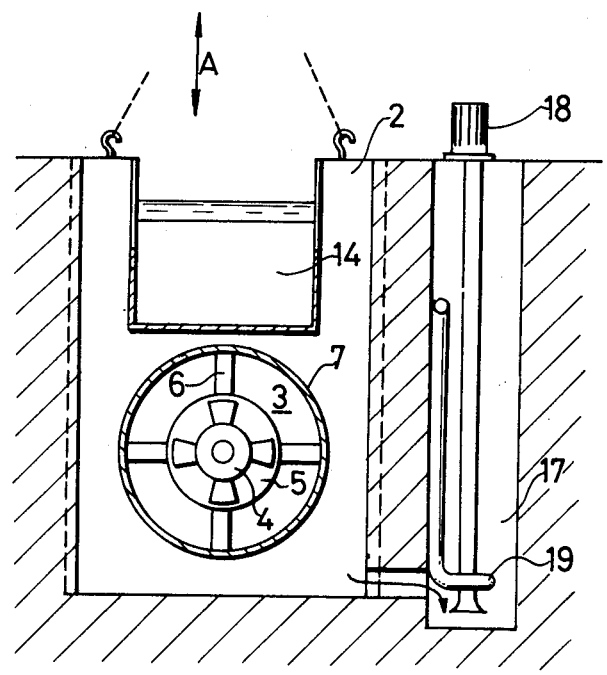
FIG. 9 is a cross-sectional illustration taken along the line IX—IX of FIG. 7 as viewed from an arrow.
Figure 10:
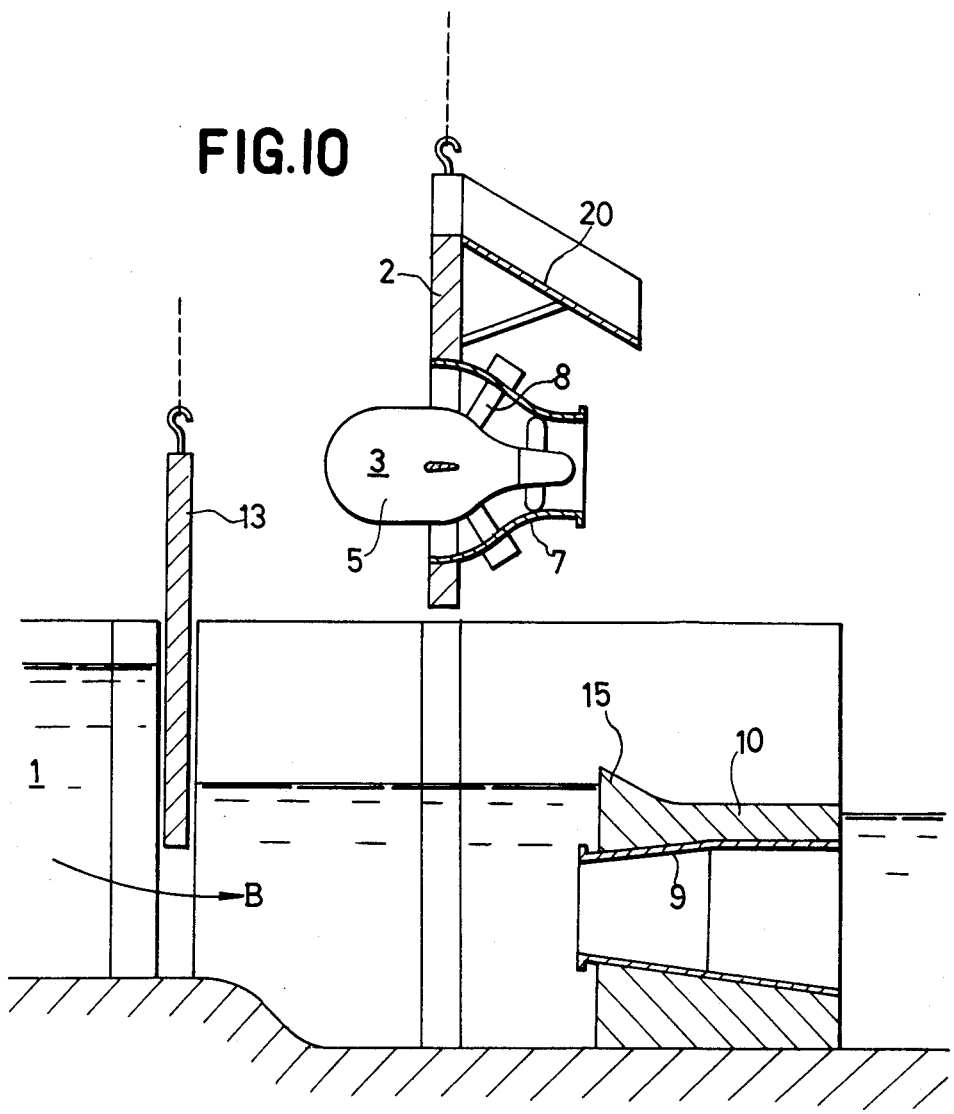
FIG. 10 is a cross-sectional illustration showing the state of lifting the gate together with the bulb turbine-generator shown in FIG. 7.

According to the foregoing embodiments, since the bulb-turbine-generator 3 is disposed in water during operation, the control of the movable guide vanes 8 is required to be carried out by lifting the gate 2 up from the water level, though such lifting is unnecessary in case of stationary guide vanes. FIGS. 7 through 10 show still other embodiments to eliminate lifting operation of the gate 2 for controlling opening angle of guide vanes, wherein a space (turbine pit 16) defined between the gate 2 and the concrete base 10 is fluid-tightly maintained. The gate 2 is fluid-tight structure, and the concrete base 10 is provided with an embankment 15 whose height is higher than the maximum water level of the discharge side 1'. The turbine pit 16 is connected to water discharge pit 17 to discharge water leaking from the gate 2 or the like into the discharge side 1' by a pump 19 driven by an electric motor 18 (FIG. 9). Therefore, since no water exists in the turbine pit 16 on the downstream side of the gate 2, a person can enter therein to inspect the outer casing and operate control means 30 for controlling opening angle of guide vanes 8. The control means can either manually or electrically with motors to alter the position of the guide vanes.

Further, an overflow panel 20 is disposed between the upper portion of the gate 2 and the embankment 15 to prevent water from entering into the turbine pit 16 of downstream side of the gate 2. The water level of the open channel is generally seasonally varied and it may exceed the upper limit to exceed the allowable fluid amount applied to the turbine generator. Furthermore, flooding occurs and water may flood over the gate 2 to enter into the space 16. This may damage the turbine parts and draft tube 9. According to this invention, if the fluid amount is less than the allowable maximum fluid amount exerted to the turbine, the water level of the upstream side of the gate 2 can be maintained to the level C less than the top end of the overflow panel 20. This is accomplished by the control of the opening angle of the guide vanes 8 upon actuation of a level governor (not shown) to thus perform effective water discharge.

On the other hand, if the fluid amount exceeds the allowable maximum fluid amount exerted to the turbine, the water level exceeds the tip end of the gate 2 to the level D, and the surplus water flows into the downstream side of the gate 2 along the overflow panel 20 by avoiding the water entrance into the turbine pit 16.

While the invention has been described in detail and with reference to specific embodiments thereof, it will be apparent to one skilled in the art that various changes and modifications can be made therein without departing from the spirit and scope thereof.

What is claimed is:

1. A movable hydroelectric power generation system in a water channel comprising: a bulb turbine generator comprising an electric power generator housed in a bulb shape inner casing and a turbine runner connected to a main shaft of said electric power generator; an outer casing having annular upstream and downstream ends, disposed outside said inner casing and positioning said inner casing by stay vanes so as to position said generator partially within said outer casing and partially outside said outer casing; a draft tube coupled to said annular downstream end of said outer casing; and a liftable gate positioned to dam up said water channel, said gate being vertically movable, said gate having an annular opening, and said annular upstream end of said outer casing being fixedly secured to said annular opening of said gate, whereby said generator is disposed on both the upstream and downstream sides of said gate, to thereby minimize the upstream and downstream extent of said movable generator system whereby the vertical movement of said generator system is enhanced by the minimal extent of said generator system.

2. The system of claim 1, wherein said draft tube is fixed to a bottom of said water channel, said draft tube having a flange member at an end thereof, said outer casing being detachably coupled to said draft tube at said flange.

3. The system of claim 1, wherein said draft tube is integral with said outer casing.

4. The system of claim 1, wherein said draft tube is embedded in a concrete base.

5. The system of claim 1, wherein said draft tube is mounted on a concrete base and is fixed thereto by bolts.

6. The system of any one of claims 1 through 5 wherein said gate is fluid-tight structure, said system further comprising an embankment disposed on a concrete base, the height of said embankment being higher than a maximum water level of a discharge side of said water channel, a turbine pit disposed on the upstream side of said embankment and a discharge pump to discharge water in said turbine pit into a downstream side of said outer casing.

7. The system of claim 1, further comprising an overflow panel disposed at the downstream side of said gate, whereby said system is operable during flood conditions.

8. The system of any one of claims 1 through 4 further comprising a water-tight section disposed between said draft tube, said gate and said outer casing and, means disposed in said water-tight section to adjust the position of said guide vanes.

9. The system of claim 1 wherein said outer casing is centrally disposed about said inner casing.

* * * * *